US012801071B2

(12) United States Patent
Yasuda et al.

(10) Patent No.: US 12,801,071 B2
(45) Date of Patent: Nov. 17, 2026

(54) IMAGE FORMING APPARATUS FOR FORMING TONER IMAGE FOR ADHERING FOIL ONTO SHEET

(71) Applicant: CANON KABUSHIKI KAISHA, Tokyo (JP)

(72) Inventors: Shuhei Yasuda, Chiba (JP); Tohru Nakaegawa, Chiba (JP); Shingo Hirota, Ibaraki (JP); Shuichi Tamura, Ibaraki (JP); Kenichiro Kitajima, Ibaraki (JP); Ryohei Terada, Chiba (JP); Daisuke Katayama, Chiba (JP); Kota Kurokawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/093,598

(22) Filed: Mar. 28, 2025

(65) Prior Publication Data

US 2025/0314998 A1 Oct. 9, 2025

(30) Foreign Application Priority Data

Apr. 3, 2024 (JP) ................................ 2024-060397

(51) Int. Cl.
*G03G 15/00* (2006.01)
*B44C 1/00* (2006.01)
(Continued)

(52) U.S. Cl.
CPC ......... *G03G 15/5029* (2013.01); *B44C 1/145* (2013.01); *G03G 15/2021* (2013.01);
(Continued)

(58) Field of Classification Search
CPC .......... G03G 15/2021; G03G 15/5016; G03G 15/6573; G03G 15/6591; G03G 15/5029;
(Continued)

(56) References Cited

U.S. PATENT DOCUMENTS

| | | | | |
|---|---|---|---|---|
| 6,597,877 | B1 * | 7/2003 | Luque .................... | B41J 11/009 399/45 |
| 9,851,673 | B2 | 12/2017 | Arai | |

(Continued)

FOREIGN PATENT DOCUMENTS

| | | | |
|---|---|---|---|
| JP | 2006-072325 | A | 3/2006 |
| JP | 2013-106110 | A | 5/2013 |

(Continued)

OTHER PUBLICATIONS

Kenichiro Kitajima et al., U.S. Appl. No. 19/090,920, filed Mar. 26, 2025.

(Continued)

*Primary Examiner* — Robert B Beatty
(74) *Attorney, Agent, or Firm* — VENABLE LLP

(57) ABSTRACT

An image forming apparatus includes an input unit to accept input of selection of a predetermined printing mode for forming a toner image for adhering foil onto a sheet via the toner image and information related to a type of the sheet, an image forming unit to form the toner image on the sheet, and a display unit to display a warning according to the information related to the type of the sheet in a case where the predetermined printing mode is selected through the input unit. The display unit outputs the warning when the type is a type that is not recommended in a foil printer for adhering the foil onto the sheet via the toner image.

14 Claims, 12 Drawing Sheets

(51) Int. Cl.
*B44C 1/14* (2006.01)
*G03G 15/20* (2006.01)

(52) U.S. Cl.
CPC ..... *G03G 15/5016* (2013.01); *G03G 15/6582* (2013.01); *G03G 15/6591* (2013.01); *B41P 2219/42* (2013.01); *G03G 2215/00426* (2013.01); *G03G 2215/00523* (2013.01); *G03G 2215/00751* (2013.01)

(58) Field of Classification Search
CPC ..... G03G 15/6582; G03G 2215/00426; G03G 2215/00523; G03G 2215/00751; G03G 2215/00801; B44C 1/145; B41F 16/0026; B41F 16/0073; B41F 19/001; B41F 23/08; B41M 7/0027; B41M 2205/40; B41P 2219/00; B41P 2219/42; B41P 2219/50
USPC ..................................... 399/45, 81, 342, 389
See application file for complete search history.

(56) References Cited

U.S. PATENT DOCUMENTS

| | | | | |
|---|---|---|---|---|
| 11,772,408 | B2 | 10/2023 | Tsukada et al. | |
| 12,064,991 | B2 | 8/2024 | Sakai et al. | |
| 2006/0077418 | A1 | 4/2006 | Nakajima et al. | |
| 2018/0067710 | A1* | 3/2018 | Miyamoto | B41F 16/0026 |
| 2018/0093468 | A1* | 4/2018 | Sasami | B41F 33/16 |
| 2019/0033766 | A1* | 1/2019 | Asakawa | G03G 15/6573 |
| 2020/0031111 | A1* | 1/2020 | Yamamuro | G03G 15/6582 |
| 2020/0201235 | A1* | 6/2020 | Konno | G03G 15/6591 |
| 2021/0008921 | A1* | 1/2021 | Sakai | B41F 16/0026 |
| 2023/0026026 | A1* | 1/2023 | Sakai | B65H 7/02 |

FOREIGN PATENT DOCUMENTS

| | | | |
|---|---|---|---|
| JP | 2014-029468 | A | 2/2014 |
| JP | 2017-156723 | A | 9/2017 |
| JP | 2017-194639 | A | 10/2017 |
| JP | 2017-223734 | A | 12/2017 |
| JP | 2018-066974 | A | 4/2018 |
| JP | 2018-174446 | A | 11/2018 |
| JP | 2019-025688 | A | 2/2019 |
| JP | 2021-012335 | A | 2/2021 |
| JP | 2021-116185 | A | 8/2021 |
| JP | 2021-194859 | A | 12/2021 |
| JP | 2022-073597 | A | 5/2022 |

OTHER PUBLICATIONS

Daisuke Katayama et al., U.S. Appl. No. 19/093,553, filed Mar. 28, 2025.
Kota Kurokawa et al., U.S. Appl. No. 19/093,537, filed Mar. 28, 2025.
Shuichi Tamura et al., U.S. Appl. No. 19/093,580, filed Mar. 28, 2025.

* cited by examiner

IMAGE FORMING APPARATUS FOR FORMING TONER IMAGE FOR ADHERING FOIL ONTO SHEET

BACKGROUND OF THE INVENTION

Field of the Invention

The present invention relates to an image forming apparatus for forming a toner image for adhering foil onto a sheet.

Description of the Related Art

Foil printing technology is used in the fields of bookbinding, commercial printing, card business, and plastic molding for cosmetic containers, among others.

Characters or designs made of foil can achieve a metallic feel that is difficult to express with printing and provide a glossy finish. Foil printing is also used for holograms of credit cards and the like. According to Japanese Patent Laid-Open No. 2017-156723 and Japanese Patent Laid-Open No. 2021-116185, there has been proposed a foil printer in which a toner image is formed on a sheet in advance, and foil is transferred onto the sheet by using the toner image as an adhesive.

However, when the foil is adhered onto the sheet via the toner, there is a possibility that a defect occurs in adhesion of the foil depending on the type of the sheet.

SUMMARY OF THE INVENTION

The present disclosure provides an image forming apparatus comprising: an input unit configured to accept input of selection of a predetermined printing mode for forming a toner image for adhering foil onto a sheet via the toner image and information related to a type of the sheet; an image forming unit configured to form the toner image on the sheet; and a display unit configured to display a warning according to the information related to the type of the sheet in a case where the predetermined printing mode is selected through the input unit.

Further features of the present invention will become apparent from the following description of exemplary embodiments (with reference to the attached drawings).

DESCRIPTION OF THE EMBODIMENTS

Figure 1:
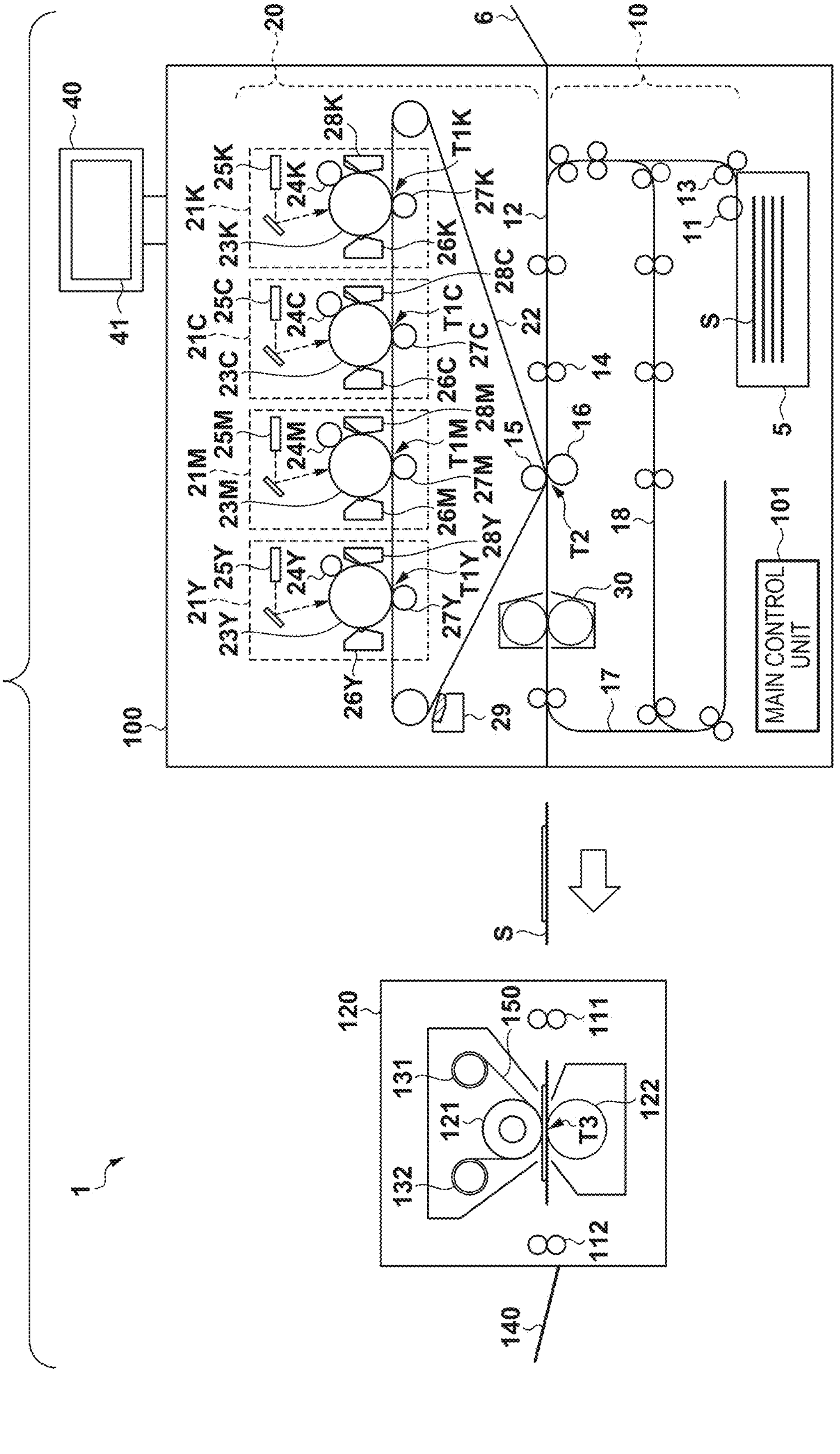
FIG. 1 is a diagram illustrating an image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

I. First Embodiment

1. Image Forming System (Foil Printing System)

As shown in FIG. 1, an image forming system 1 includes an image forming apparatus 100 and a foil printer 120. The image forming apparatus 100 forms a toner image on a sheet (also referred to as a recording material) S. The foil printer 120 prints foil on the sheet S using a toner of the toner image as a glue.

The image forming system 1 is a so-called offline type system in which the foil printer 120 is not mechanically coupled to image forming apparatus 100.

In this case, the sheet S on which the toner image is formed is discharged from image forming apparatus 100 and then manually inserted to the foil printer 120 by a user (see an arrow in the drawing). In other embodiments, an inline type system may be provided in which the foil printer 120 is coupled to image forming apparatus 100. In this case, the sheet S is automatically transferred from image forming apparatus 100 to the foil printer 120. In yet another embodiment, an integrated printing device may be provided that incorporates the foil printing capability of the foil printer 120 into the interior of the image forming apparatus 100.

1-1. Image Forming Apparatus

The image forming apparatus 100 may be a color printer or a monochrome printer. In the example of FIG. 1, the image forming apparatus 100 is a tandem full color printer capable of forming full color images with an electrophotographic manner. The image forming apparatus 100 includes a cassette 5, a manual feed tray 6, a conveyance unit 10, an image forming unit 20, a fixing unit 30, an operation unit 40, and a main control unit 101.

The image forming unit 20 is an image forming unit including a process unit 21Y, 21M, 21C and a 21K, an intermediate transfer belt 22, and a belt cleaner 29. The process units 21Y, 21M, 21C and 21K are arranged in parallel along the moving direction of the intermediate transfer belt 22 to form toner images of yellow, magenta, cyan, and black, respectively. Note that YMCK characters assigned to the end of the reference numerals in FIG. 1 may be omitted when the matters common to the four colors are described. The intermediate transfer belt 22 is stretched over a plurality of rollers and rotates. As will be described later, the toner images of the four color components are transferred to the intermediate transfer belt 22 and superimposed on each other (primary transfer), thereby forming a full-color toner image. The intermediate transfer belt 22 carries the full-color toner image and conveys it to a secondary transfer position T2.

The cassette 5 is an accommodation unit that accommodates a bundle of sheets. Although FIG. 1 shows an embodiment in which the image forming apparatus 100 includes only one cassette 5, the image forming apparatus 100 may include a plurality of cassettes 5 capable of accommodating sheets S of differing types (e.g., size, thickness, or presence or absence of surface-coating). In this case, the sheet S of the type designated in each job is fed from the corresponding cassette 5. Note that the sheet S may be fed from a manual feed tray 6 instead of the cassette 5. Further, the image forming system 1 may include a paper feeder (not illustrated) separate from image forming apparatus 100.

The conveyance unit 10 is a conveyance unit including a conveyance path and a plurality of rollers. The feeding roller 11 feeds the sheets one by one from the bundle of the sheets S in the cassette 5 to the conveyance path 12. The conveyance roller 13 conveys the sheet along the conveyance path 12. The registration roller 14 feeds the sheet S to the secondary transfer position T2 in synchronization with the timing at which the toner image on the intermediate transfer belt 22 reaches the secondary transfer position T2.

Since the configuration of the process unit 21Y, 21M, 21C and 21K may be similar to each other, they are referred to as a process unit 21. The process unit 21 includes a photosensitive drum 23, a charger 24, an exposure unit 25, a developing unit 26, a primary transfer roller 27, and a drum cleaner 28. The photosensitive drum 23 is a cylindrical image carrier and rotates in the counterclockwise direction in the drawing. The charger 24 may be, for example, a corona charger that irradiates charged particles by corona discharge, and charges the surface of the photosensitive drum 23 to a uniform potential (e.g. a negative dark portion potential). The charger 24 may have a roller or a wire for discharging. The exposure unit 25 includes, for example, a semiconductor laser as a light source, and scans the surface of the photosensitive drum 23 with a laser beam according to the input image data to form an electrostatic latent image on the surface of the photosensitive drum 23. The developing unit 26 accommodates, for example, a developer including a toner and a carrier in its interior, and develops the electrostatic latent image on the surface of the photosensitive drum 23 by supplying the developer to the photosensitive drum 23 to form a toner image.

As an example, the developer may be a two-component developer including a non-magnetic toner and a magnetic carrier. The toner may contain a binder resin, a colorant, and a release agent (wax).

A primary transfer roller 27 is disposed at a primary transfer position T1 so as to face the photosensitive drum 23. The primary transfer roller 27 is supplied with a primary transfer bias of high voltage and transfers the toner image (here, yellow) on the surface of the photosensitive drum 23 to the intermediate transfer belt 22. The drum cleaner 28 removes a toner remaining on the surface of the photosensitive drum 23 after the primary transfer.

Similar to the process unit 21Y, magenta, cyan, and black toner images are formed in the process units 21M, 21C and 21K, respectively. Then, these toner images are sequentially transferred and superimposed on the yellow toner image on the intermediate transfer belt 22.

A secondary transfer outer roller 16 is disposed at the secondary transfer position T2 so as to face a secondary transfer inner roller 15, which is one of the rollers over which the intermediate transfer belt 22 is stretched. The secondary transfer outer roller 16 is supplied with a secondary transfer bias of high voltage and transfers the full-color toner image carried by the intermediate transfer belt 22 to the sheet S that has reached the secondary transfer position T2 (secondary transfer). The belt cleaner 29 removes a toner remaining on the intermediate transfer belt 22 after the secondary transfer.

The fixing unit 30 is a fixing unit disposed downstream of the secondary transfer position T2. The fixing unit 30 includes a fixing roller (or a cylindrical heating film) and a pressure roller, and fixes the toner image on the sheet S by heating and pressing the sheet S on which the toner image has been transferred. The sheet S that has passed through the fixing unit 30 is discharged to the outside of the image forming apparatus 100 (e.g. to a discharge tray (not illustrated).

When double-side printing is executed, the sheet S on which the toner image is formed on the first surface is conveyed to the conveyance path 17. Therefore, the sheet S reverses the traveling direction and enters the conveyance path 18 for the double-side printing. The sheet S returns to the conveyance path 12 with its front and back sides reversed. The toner image is transferred to the second surface of the sheet S at the secondary transfer position T2.

The fixing unit 30 fixes the toner image on the second surface of the sheet S by heating and pressing the sheet S again. Then, the sheet S is discharged to the outside of image forming apparatus 100.

The operation unit 40 is an operation unit that provides a user interface to a user of the image forming system 1. The operation unit 40 includes, for example, a touch panel 41. The touch panel 41 displays an image and information according to control by a main control unit 101 described later, and accepts a touch input by a user. The operation unit 40 may include an output device (e.g. a liquid crystal display or a speaker) and an input device (e.g. a button, a switch, a keypad, or a microphone) instead of (or in addition to) the touch panel 41.

The main control unit 101 is a control unit that controls the overall operation of image forming apparatus 100. For example, the main control unit 101 controls the image forming unit 20 to form an image on the sheet S based on input image data received from an external device when the execution of the print job is instructed. The external device here may be, for example, a personal computer (PC) or an external controller. Although not shown in FIG. 1, the image forming apparatus 100 may further include a document reading unit. That is, the image forming apparatus 100 may be a multifunction peripheral. In this example, when the execution of the copy job is instructed, the main control unit 101 controls the image forming unit 20 to form an image on the sheet S based on the read image data generated by the scanner unit reading the document.

1-2. Foil Printer (Foil Processing Equipment)

The foil printer 120 includes a conveyance roller 111, a discharge roller 112, a heating roller 121, a pressure roller 122, a supply reel 131, a retrieval reel 132, and a discharge tray 140.

The conveyance roller 111 receives the sheet S on which the toner image is formed, and feeds the sheet S to an adhering position T3. In the adhering position T3, the heating roller 121 and the pressure roller 122 are disposed so as to face each other. The supply reel 131 is wound with a foil sheet 150 composed of foil and a film-shaped holding member for holding the foil. The leading end of the foil sheet 150 is fixed to the retrieval reel 132.

The supply reel 131 and the retrieval reel 132 suspend the foil sheet 150 via the lower surface of the heating roller 121 while maintaining a predetermined tension so as not to cause wrinkles in the foil sheet 150. Although not shown in FIG. 1, the foil printer 120 may include additional suspension rollers to stably maintain the tension of the foil sheet 150. The supply reel 131 rotates in the clockwise direction in the drawing to supply the foil sheet 150 to the adhering position T3. The heating roller 121 heats the sheet S that has reached the adhering position T3. Accordingly, a result, at least one type of toner used as a glue (adhesive) among the toners constituting the toner image melts. The pressure roller 122, together with the heating roller 121, presses the foil sheet 150 against the sheet S. As a result, the melted toner acts as a glue, and the foil on the foil sheet 150 is adhered onto the sheet S via the toner. The retrieval reel 132 rotates in the counterclockwise direction in the drawing, and winds up the foil sheet 150. At this time, the foil on the foil sheet 150 is peeled off from the support member and adhered onto the sheet S to form an image of the foil on the sheet S. The discharge roller 112 discharges the sheet S that has passed through the adhering position T to the discharge tray 140.

1-3. Foil

Figure 2A:
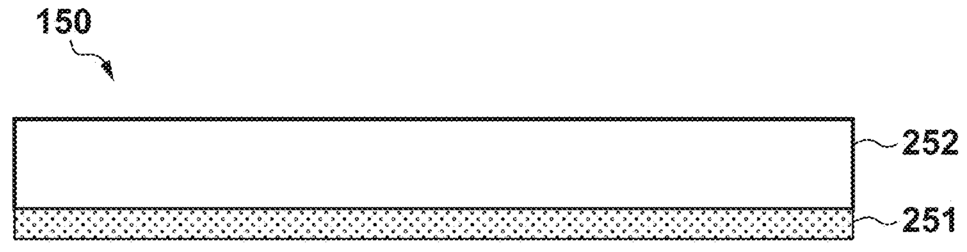
FIGS. 2A and 2B are drawings explaining foil processing.

FIG. 2A shows an example of the construction of the foil sheet 150. The foil sheet 150 includes a foil layer 251 and a backup layer 252. The foil layer 251 is a sheet-like layer made of a metal material. The metal material of the foil layer 251 may be, for example, aluminum, tin, silver, copper, chromium, nickel, gold, or iron, or an alloy of two or more thereof (e.g., nickel-chromium steel, bronze, or aluminum bronze). The backup layer 252 is a sheet-like layer made of resin that supports the foil layer 251. The resin material of the backup layer 252 may be, for example, polyethylene terephthalate (PET), polyethylene naphthalate (PEN), polypropylene (PP), polyether sulfone (PES), or polyimide (PI).

1-4. Formation of Foil Images

Figure 2B:
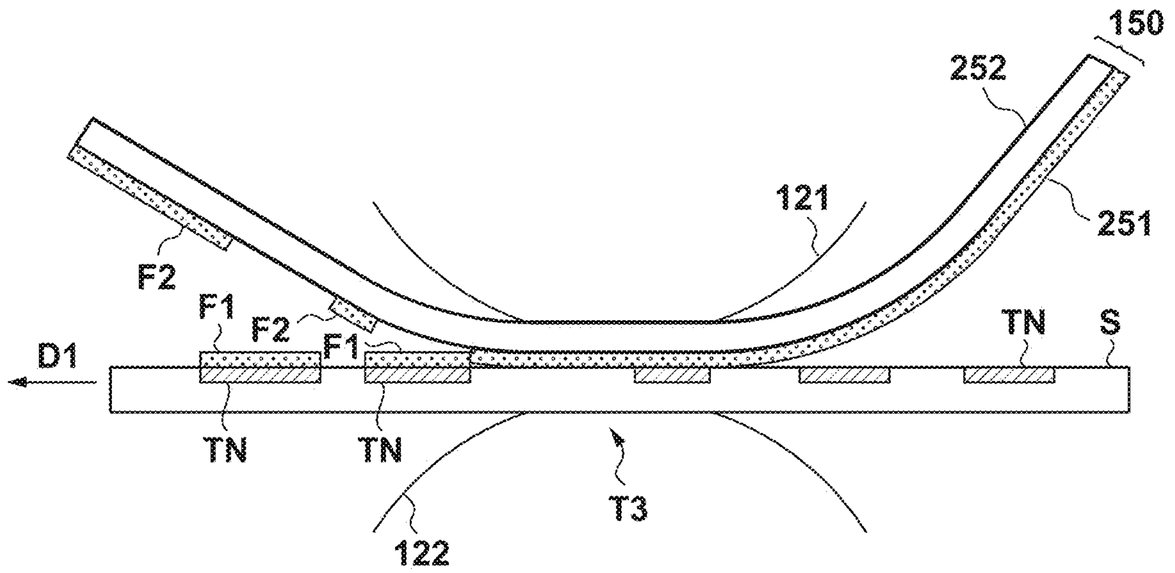

FIG. 2B shows an enlarged view of the vicinity of the adhering position T3 while the foil printer 120 is operating. In this example, the heating roller 121 positioned on the adhering position T3 and the pressure roller 122 positioned below the adhering position T3 nip the sheet S on which the toner image TN is formed and the foil sheet 150. The heating roller 121 and the pressure roller 122 rotate according to the rotation of the retrieval reel 132 driven by a motor (not illustrated), and convey the sheet S and the foil sheet 150 toward the conveyance direction D1.

The surface temperature of the heating roller 121 is controlled so that the temperature of the toner in the toner image TN reaches the melting point. This temperature is, for example, from 140° C. to 180° C. When the temperature of the toner reaches the melting point at the adhering position T3, the toner melted and increased in viscosity acts as a glue. The toner image TN is further pressed by the pressure roller 122 to adhere to the foil layer 251 of the foil sheet 150. Therefore, when the sheet S and the foil sheet 150 pass through the adhering position T3, the foil F1 of the foil layer 251 in contact with the toner image TN is peeled off from the backup layer 252 while being adhered onto the sheet S. On the other hand, the foil F2 of the foil layer 251 that is not in contact with the toner image TN is retrieved by the retrieval reel 132 while remaining on the backup layer 252 without being adhered onto the sheet S. Consequently, the foil layer 251 is selectively transferred to the sheet S according to the pattern of the toner image TN on the sheet S to form a foil image on the sheet S.

1-5. Relationship Between Jams and Margins

The conveyance direction D1 is also an insertion direction in which the sheet S is inserted into the foil printer 120. If the margin provided at the leading end of the sheet S is not sufficiently large in the conveyance direction D1, the sheet S is jammed in the foil printer 120. This is because the foil layer 251 and the sheet S cannot be successfully peeled from the backup layer 252. Therefore, the size of the margin on the leading end side needs to be a value such that separating is successful. For example, the leading end margin may be equal to or larger than 1 mm. However, the size of the required leading end margin may vary depending on the type, size, and use environment of the sheet S. Therefore, the length of the leading end margin may be equal to or greater than 5 mm. Note that the length of the margin on the leading end side may be designated in the instruction manual of the foil printer 120.

1-6. Foil Printing Mode

The type of sheet S that can be formed a toner image with the image forming apparatus 100 (e.g., size, thickness, basis weight, presence or absence of surface coating, etc.) may not match the type of sheet S that can be subjected to foil processing by the foil printer 120. Therefore, there is a possibility that the foil printer 120 cannot use the sheet S on which images are printed by the image forming apparatus 100 in a normal printing mode. Therefore, the image forming apparatus 100 may be provided with a foil printing mode for forming a toner image on the sheet S that can be subjected to foil processing by the foil printer 120.

Figure 3A:
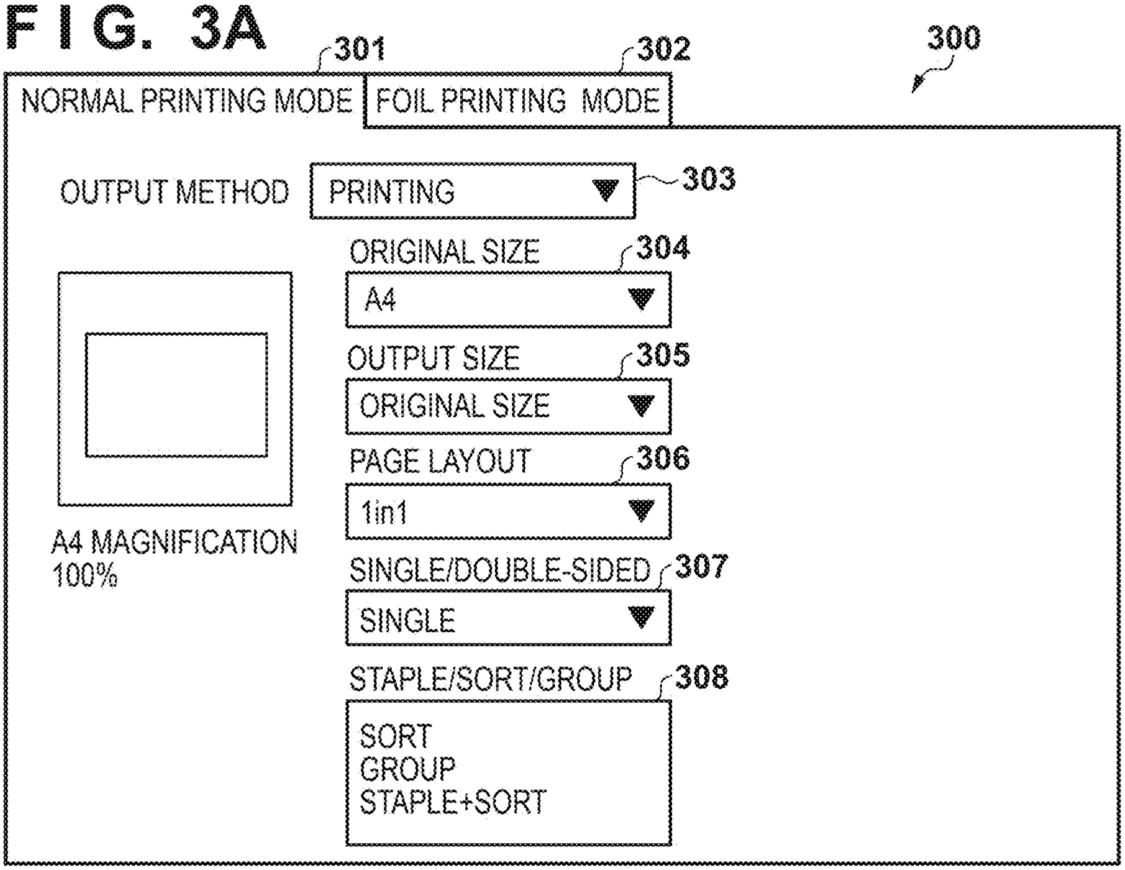
FIGS. 3A and 3B are drawings explaining a user interface.
Figure 3B:
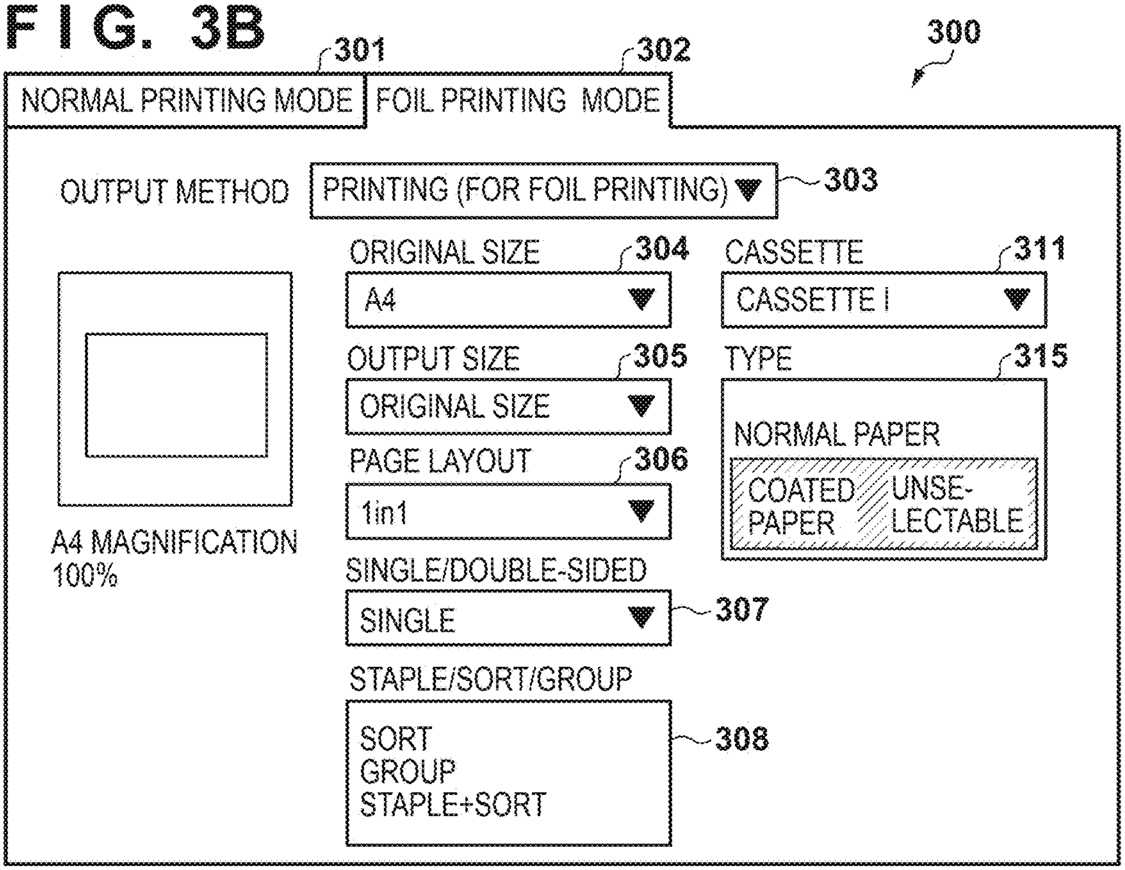

FIG. 3A and FIG. 3B are diagrams illustrating a user interface (UI) 300 for instructing the image forming apparatus 100 to execute a print job from the operation unit 40 or PC. A tab 301 is a setting screen for the normal printing mode. A tab 302 is a setting screen for the foil printing mode. In FIG. 3A, the normal printing mode is selected. In FIG. 3B, the foil printing mode is selected.

A menu 303 is a menu for designating an image output method (e.g. printing, transmitting, and storing). A menu 304 is a menu for selecting a document size. A menu 305 is a menu for selecting an output size of an image for the sheet S. A menu 306 is a menu for selecting a page layout (e.g., 1in1, 2in1). A menu 307 is a menu for selecting single-side printing or double-side printing. A setting unit 308 is UI for selecting the presence or absence of stapling (using stapler), the presence or absence of grouping, or the presence or absence of sorting.

As shown in FIG. 3B, a menu 311 is a menu for selecting a sheet cassette. A type selection unit 314 displays a list of selection candidates for selecting the type of the sheet S, and accepts selection of one type from a plurality of selection candidates.

Note that it is difficult for the foil printer 120 to apply foil processing to a stapled sheet S. Therefore, in the tab 302 for the foil printing mode, the setting unit 308 may be restricted from selecting the staple.

Figure 4:
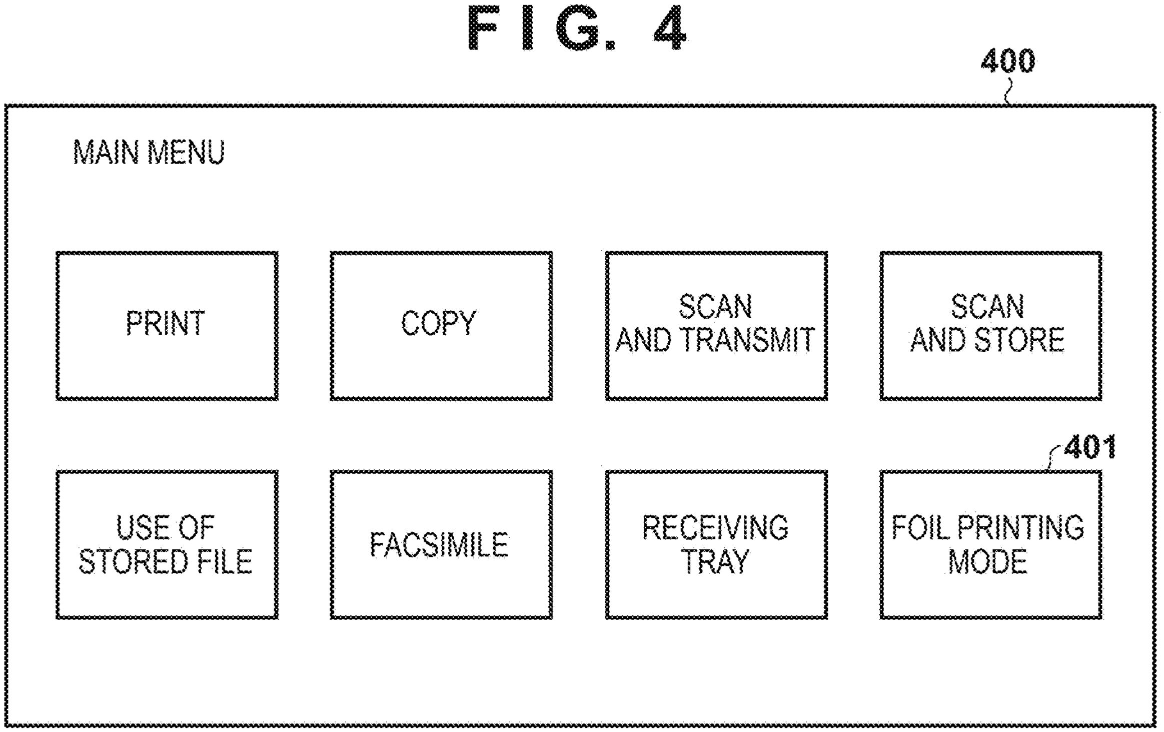
FIG. 4 is a drawing explaining a user interface.

FIG. 4 shows another UI 400 displayed on the operation unit 40 of the image forming apparatus 100. A button 401 is a button for instructing the image forming apparatus 100 to switch from the normal printing mode to the foil printing mode. When the button 401 is pressed, the operation unit 40 may display a setting screen such as the tab 302 or UI 500 illustrated in FIG. 5.

Figure 5:
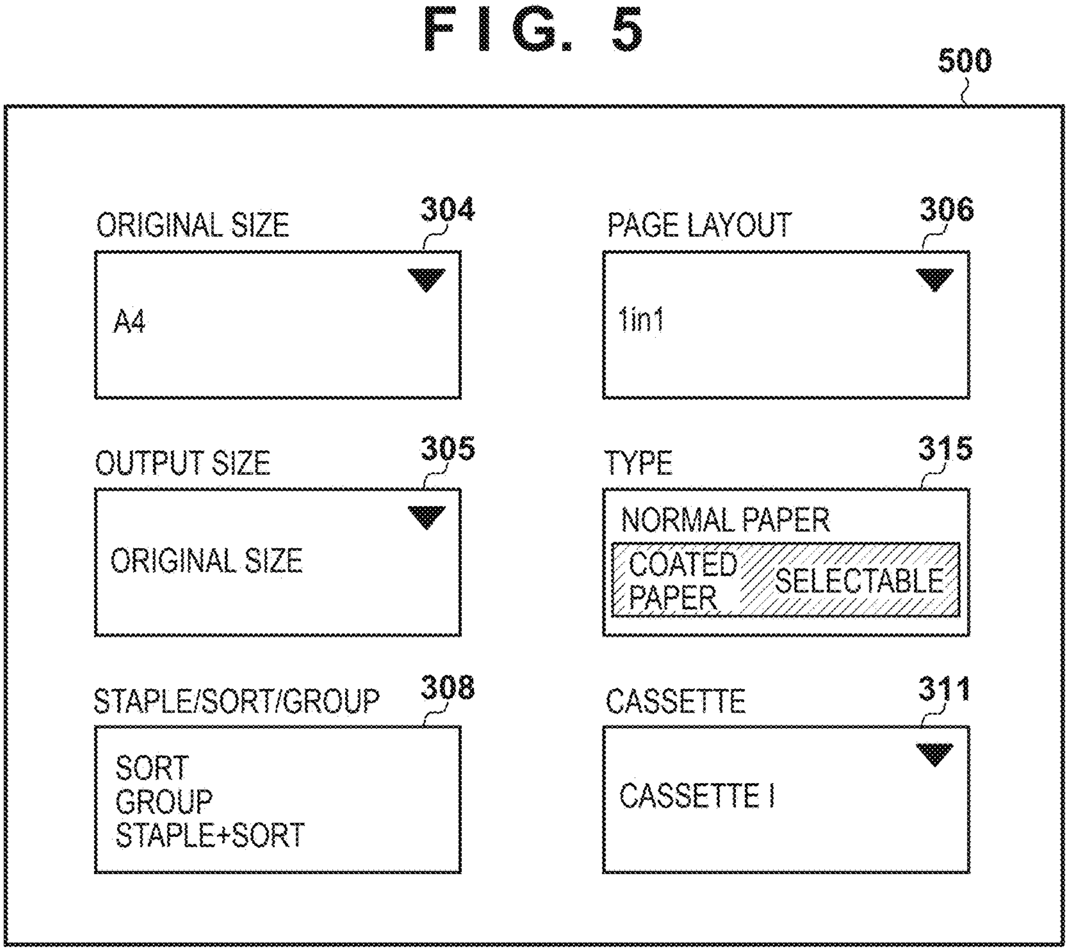
FIG. 5 is a drawing explaining a user interface.

UI 500 illustrated in FIG. 5 may include the menus 304, 305, 306, and 311, the setting unit 308, and the type selection unit 315, similarly to the tab 302.

1.7 Controller (Control System)

Figure 6:
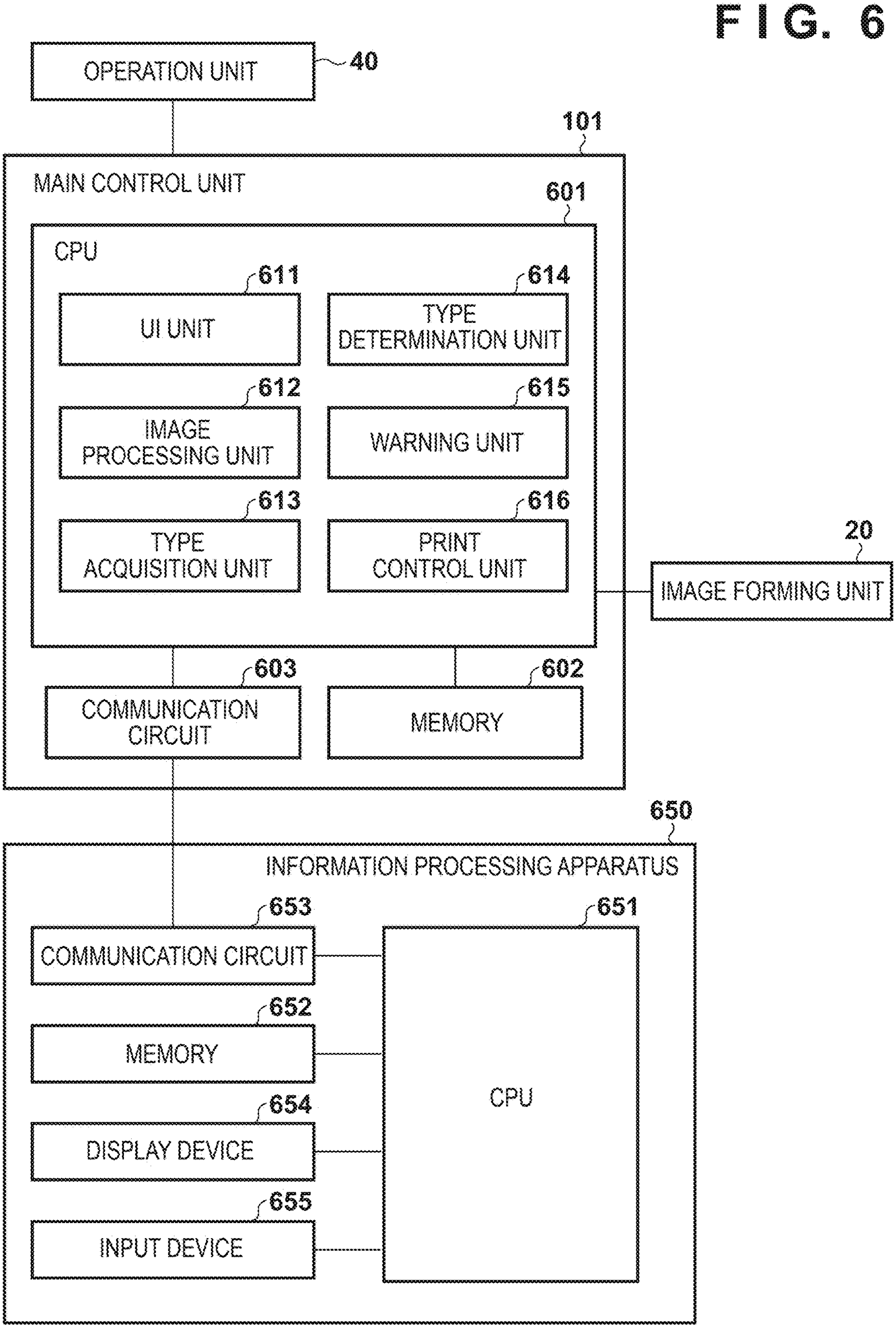
FIG. 6 is a drawing explaining a controller.

FIG. 6 shows a controller of the image forming system 1. A motor and a power supply other than the load illustrated are connected to the main control unit 101, since they are not the present invention, their illustration and description are omitted.

The main control unit 101 includes, for example, a central processing unit (CPU) 601, a memory 602, and a communication circuit 603. The memory 602 may include a read only memory (ROM), a random access memory (RAM), and the like. The CPU 601 implements various functions by executing a control program stored in a ROM area of the memory 602.

UI unit 611 displays information on the operation unit 40 and accepts an instruction and information inputted by a user through the operation unit 40. An image processing unit 612 expands print data described by a page description language (PDL) into image data, converts a color space of the image data, and so on. Further, the image processing unit 612 may enlarge or reduce an image or rotate an image.

A type acquisition unit 613 acquires the type of the sheet S designated in the print job received from an information processing apparatus 650 or the type of the sheet S designated through the operation unit 40. Further, the type acquisition unit 613 acquires the type (recommended type) of the sheet S suitable for the foil processing in the foil printer 120 from the foil printer 120 through the communication circuit 603. Alternatively, the type acquisition unit 613 may acquire the type of the sheet S suitable for the foil processing in the foil printer 120 from the specification of the foil printer 120, the instruction manual, or Web page on which the foil printer 120 is posted.

A type determination unit 614 determines whether or not the type of the sheet S designated by the user is a type of the sheet S suitable for foil processing in the foil printer 120. A warning unit 615 displays warning information on the operation unit 40 or a display device 654 of the information processing apparatus 650 when the type of the sheet S designated by the user is not the type of the sheet S suitable for foil processing in the foil printer 120. The print control unit 616 controls the image forming unit 20 according to a print job.

These functions may be implemented individually by integrated circuitry provided outside the CPU 601 and can communicate with the CPU 601. The communication circuit 603 is an interface circuit used by the CPU 601 to communicate with the foil printer 120 and the information processing apparatus 650.

The image forming apparatus 100 may optionally communicate with the information processing apparatus 650. The CPU 651 of the information processing apparatus 650 executes an operating system (OS) and a printer driver stored in a memory 652 and controls the image forming apparatus 100. The CPU 651 communicates with the image forming apparatus 100 through a communication circuit 653. The memory 652 is a storage device that may include a hard disk drive, a solid state drive (SSD), or the like in addition to ROM, and RAM. A display device 654 is a liquid crystal display or the like that displays a UI 300, a UI 500, and the like. An input device 655 may include a keyboard, a pointing device, a touch sensor, a microphone, and the like.

Note that the CPU 651 may include the UI unit 611, the type acquisition unit 613, the type determination unit 614, and the warning unit 615. That is, the CPU 651 may accept the selection of the type of the sheet S, and executes determination of the type, warning, change of the type, and the like prior to sending the print job to the image forming apparatus 100. In this case, the UI unit 611, the type acquisition unit 613, the type determination unit 614, and the warning unit 615 may be implemented by the printer driver.

1-8. Control in Foil Printing Mode

The types of sheets S used in the image forming apparatus 100 with the electrophotographic manner vary widely. Therefore, there are also types of sheets S (not recommended types) that are not suitable for foil processing in the market. For example, the foil printer 120 cannot apply foil processing using the foil sheet 150 that is a hot stamp foil to a coated paper, a glossy paper, or the like. The coated paper and the glossy paper may include latex (e.g., styrene-butadiene based latex (SBR)). Such a latex contains a material having an allowable temperature limit lower than the heating temperature of the heating roller 121 as a main component. In the foil processing by the foil printer 120, the surfaces of the coated paper and the glossy paper are softened by the heat transferred from the heating roller 121. Furthermore, pressure from the pressure roller 122 is applied to the sheet S and the foil sheet 150. As a consequence, the foil layer 251 of the foil sheet 150 may be thermally pressure-transferred not only to the toner TN on the sheet S, but also to other surface portions on the sheet S. On the other hand, a plain paper and the like contain a material having an allowable temperature limit higher than the heating temperature of the heating roller 121 as a main component. Since the sheet S of this type is not softened by heat, it is difficult to cause a foil processing defect. In the present embodiment, the coated paper and the glossy paper are just examples of the type of the sheet S containing a material having an allowable temperature limit lower than the heating temperature of the heating roller 121 as a main component.

Figure 7:
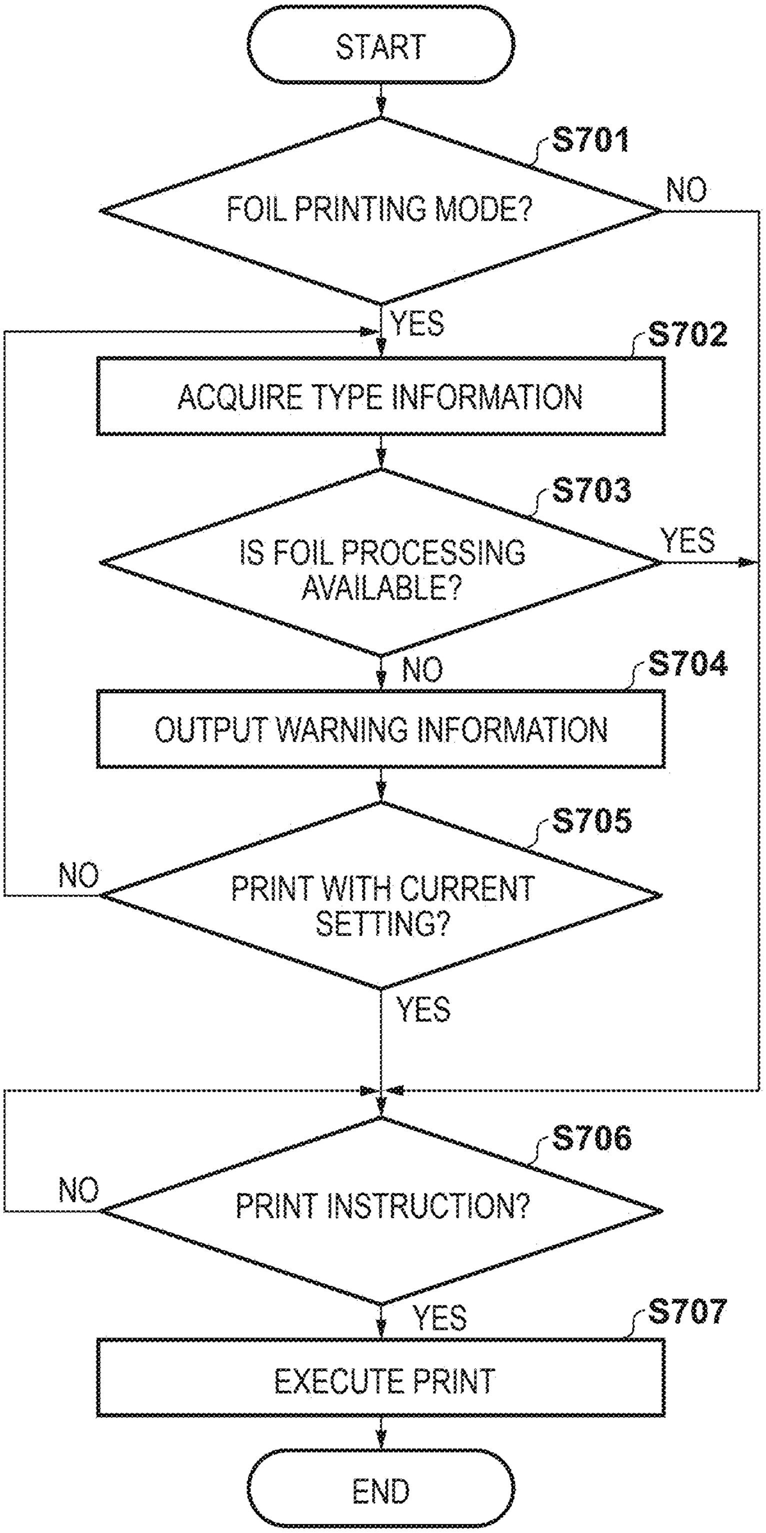
FIG. 7 is a flowchart showing a controlling method.

FIG. 7 shows a control method for reducing foil processing defects caused by the type of sheet S. Note that, when a frequency of occurrence of foil processing defects decreases, wasteful consumption of consumables (e.g., the foil sheet 150 and the sheet S) will also be suppressed.

In S701, the CPU 601 determines whether the foil printing mode is selected as the printing mode. If the foil printing mode is selected, the CPU 601 advances the process from S701 to S702. When the normal printing mode is selected, the CPU 601 advances the process from S701 to S706. Here, a normal image is an image prepared by a user and not subjected to foil processing.

In S702, the CPU 601 (type acquisition unit 613) acquires type information of a sheet S. The type information is information (e.g. a general name, a product name, a product code, and a surface material of the sheet S) that can specify the type of the sheet S. As described above, the type acquisition unit 613 acquires the type information of the sheet S used in a print job and the type information of the sheet S that can be subjected to the foil processing by the foil printer 120. These may be stored in the memory 602 or acquired in real time in advance. In the latter case, the CPU 601 (UI unit 611) may display the tab 302 or the UI 500 on the operation unit 40 or the display device 654 to accept type information inputted by the user. As illustrated in FIG. 3B and FIG. 5, the UI unit 611 may display the non-recommended type information (e.g., coated paper) and the recommended type information (e.g., plain paper) in a display mode that can be distinguished from each other. In this example, the plain paper is not highlighted and the coated paper is highlighted. The color of the characters of the non-recommended type information may be different from the color of the characters of the recommended type information.

In S703, the CPU 601 (type determination unit 614) determines whether or not the type of the sheet S used in the print job is a type that can be subjected to foil processing, based on the acquired type information. If the type of the sheet S is a type that can be subjected to foil processing, the CPU 601 advances the process from S703 to S706. On the other hand, if the type of the sheet S is not a type that can be subjected to foil processing, the CPU 601 advances the process from S703 to S704.

Figure 8:
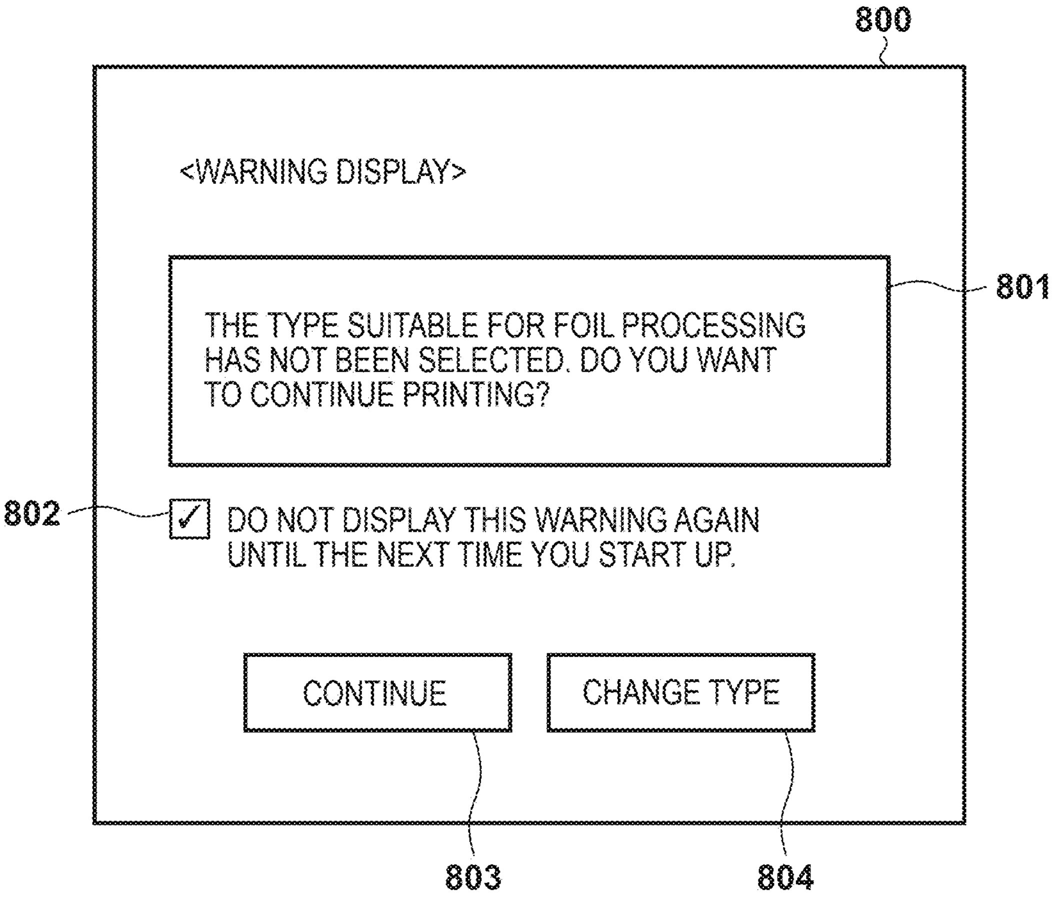
FIG. 8 is a drawing explaining a user interface.

In S704, the CPU 601 (UI unit 611 and warning unit 615) outputs warning information to the operation unit 40 or the display device 654. FIG. 8 shows a warning UI 800 for outputting the warning information. A warning message 801 includes a character or image that informs the user that a type suitable for foil processing has not been selected. In this example, the warning message 801 also includes a message for querying the user whether to continue printing. A checkbox 802 is a UI for canceling repeated display of the warning. A continue button 803 is a button for instructing to continue printing. A type change button 804 is a button for changing the type of the sheet S.

In S705, the CPU 601 (UI unit 611 and warning unit 615) determines whether to continue printing with the current setting. Upon detecting that the continue button 803 has been pressed, the CPU 601 advances the process from S705 to S706. On the other hand, when it is detected that the type change button 804 is pressed, the CPU 601 advances the process from S705 to S702 and accepts the change of the type information.

In S706, the CPU 601 determines whether a print instruction is input from the operation unit 40 or the input device 655.

When the print instruction is inputted, the CPU 601 advances the process from S706 to S707.

In S707, the CPU 601 (print control unit 616) controls the image forming unit 20 to form an image according to the print job for the sheet S.

Note that, when S701 to S705 are executed by the CPU 651 of the information processing apparatus 650, the CPU 651 transmits the print job to image forming apparatus 100. The CPU 601 executes printing according to the print job.

In the present embodiment, a timing of displaying the warning UI 800 is earlier than S706, but this is merely an example. The warning UI 800 may be displayed between S706 and S707.

By displaying a warning when the user sets the type of the sheet S as described above, it is possible to suppress an image for foil processing from being wasted due to an artificial error.

II. Second Embodiment

In the first embodiment, when a type that is not suitable for foil processing is selected, a warning is output. In the second embodiment, selection of a type that is not suitable for foil processing is restricted.

Figure 9A:
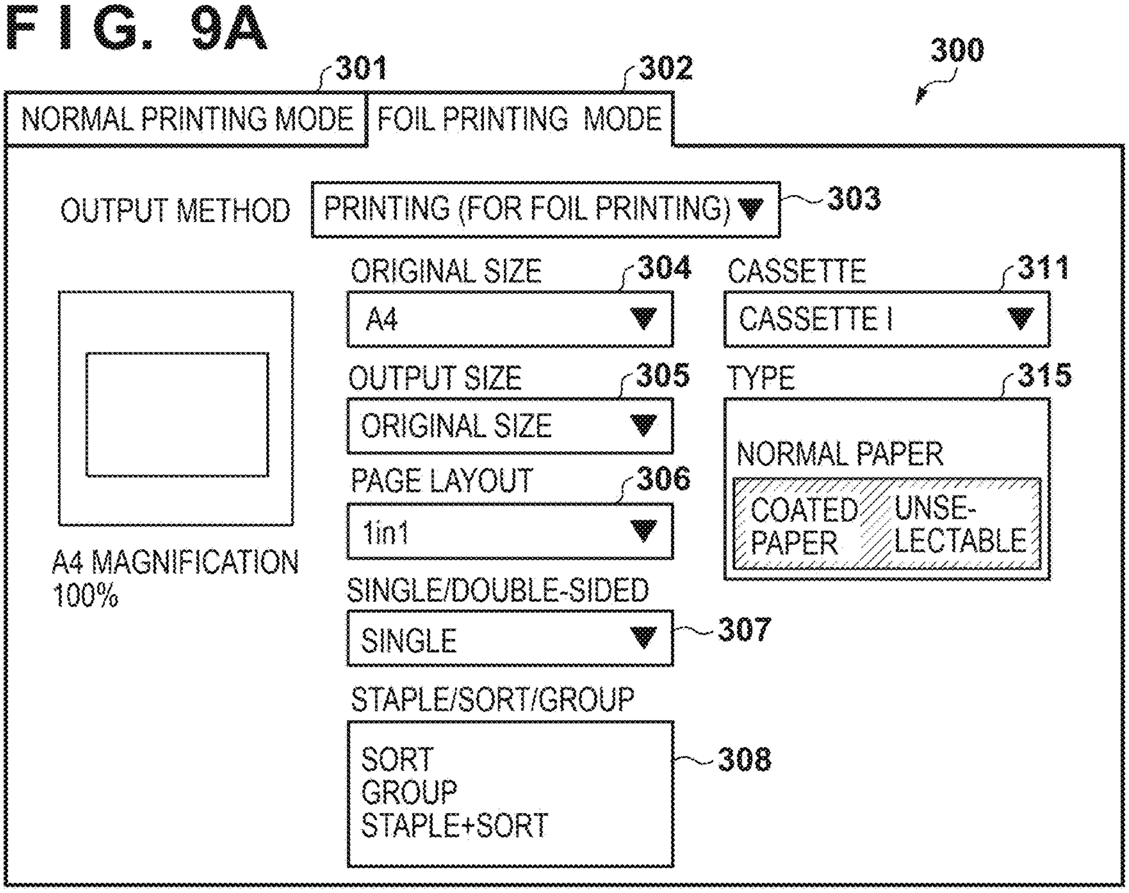
FIGS. 9A and 9B are drawings explaining a user interface.
Figure 9B:
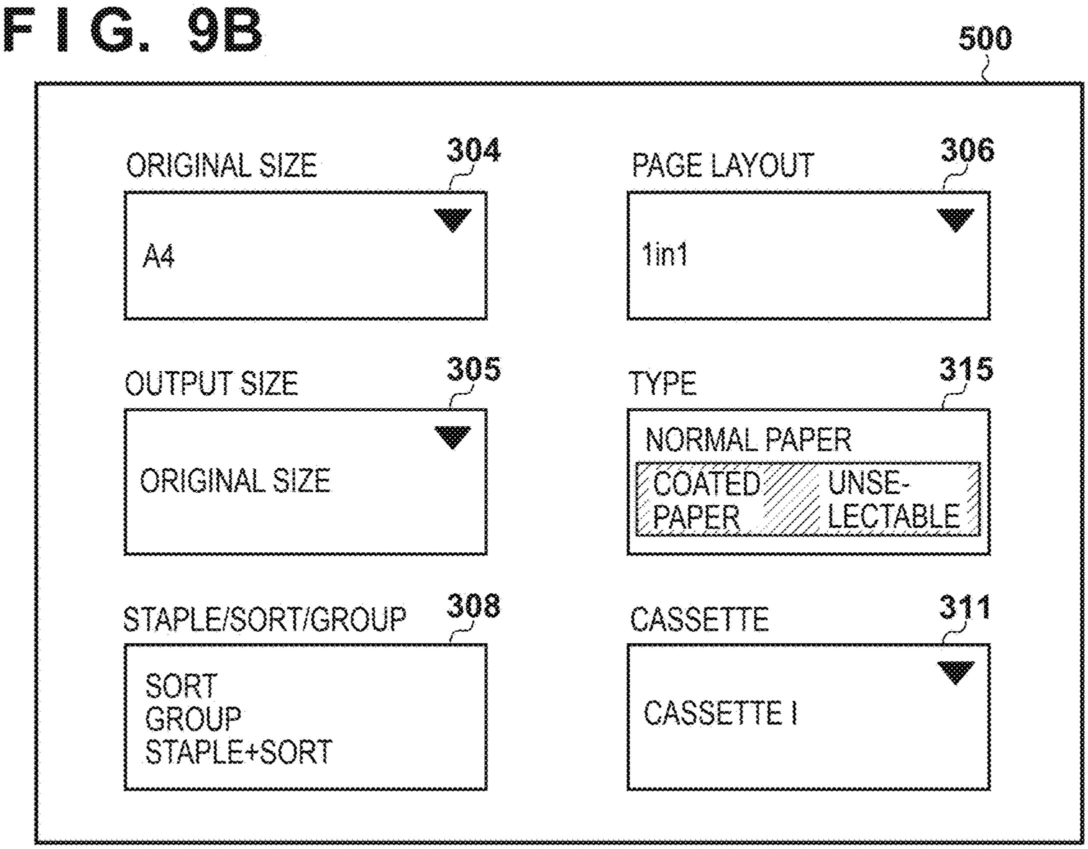

FIG. 9A shows an example of tab 302 where selection of a type that is not suitable for foil processing is restricted. FIG. 9B shows an example of UI 500 in which the selection of a type that is not suitable for foil processing is restricted. In these examples, the type selection unit 315 grays out a type that is not suitable for foil processing, and prohibits or does not accept selection by the user. Note that the gray out is merely an example, and other methods may be adopted as a method of restricting selection of a type that is not suitable for foil processing. For example, the type selection unit 315 may not display a type that is not suitable for foil processing.

Figure 10:
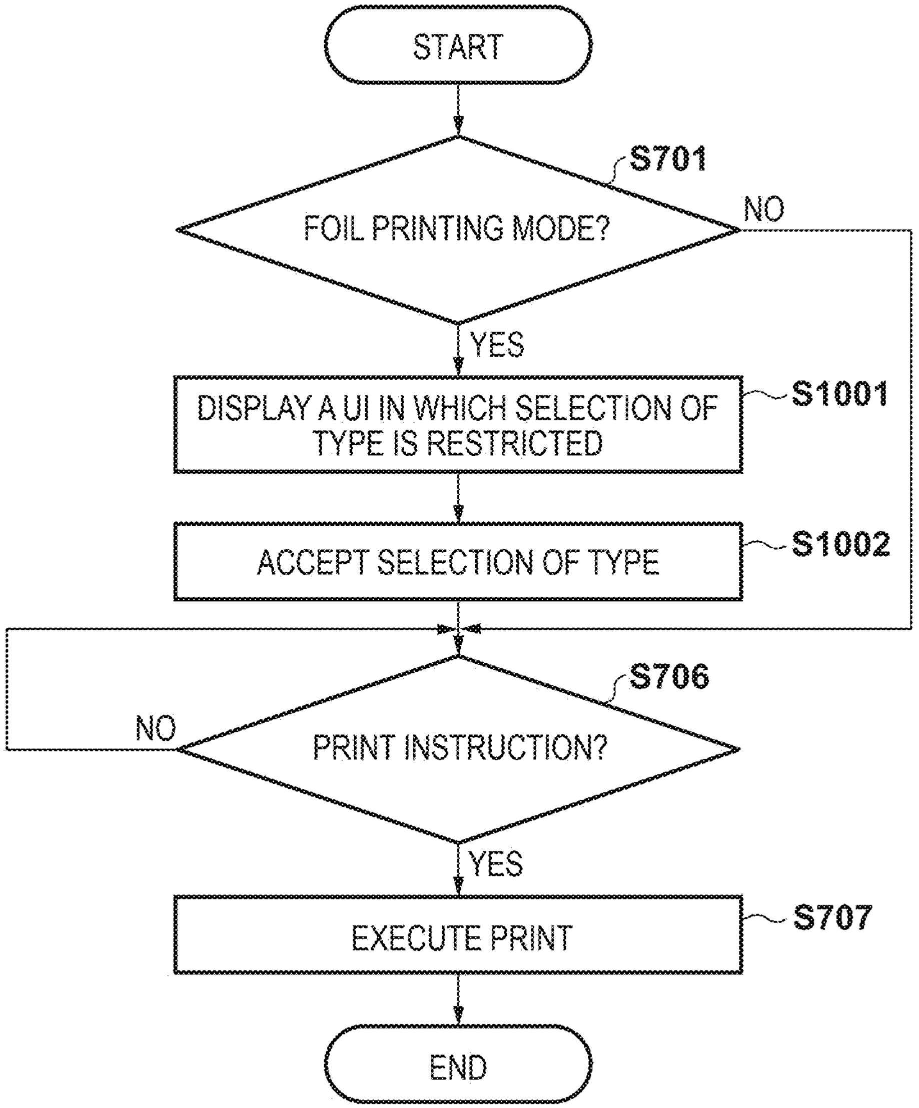
FIG. 10 is a flowchart showing a controlling method.

FIG. 10 shows a control method for reducing foil processing defects caused by the type of sheet S. Descriptions of steps common to those shown in FIG. 7 among the steps shown in FIG. 10 are omitted. Here, S702 to S705 is replaced by S1001 and S1002. That is, S1001 and S1002 are executed in the foil printing mode.

In S1001, the CPU 601 or the CPU 651 (UI unit 611) displays a UI (e.g., a UI illustrated in FIG. 9A or FIG. 9B) in which the selection of the type is restricted on the operation unit 40 or the display device 654.

In S1002, the CPU 601 or the CPU 651 (UI unit 611) accepts selection of a type through the displayed UI. In this case, since the type that is not suitable for foil processing is not selectable in principle, only the type that is suitable for foil processing is selected.

According to the second embodiment, restrictions are provided on the types that can be selected by the user. As a result, an artificial error is suppressed, and an image for foil processing is smoothly formed on the sheet S.

III. Third Embodiment

In the first embodiment and the second embodiment, the foil printer 120 was separated from the image forming apparatus 100. However, the foil printer 120 may be coupled (connected) to the image forming apparatus 100.

Figure 11:
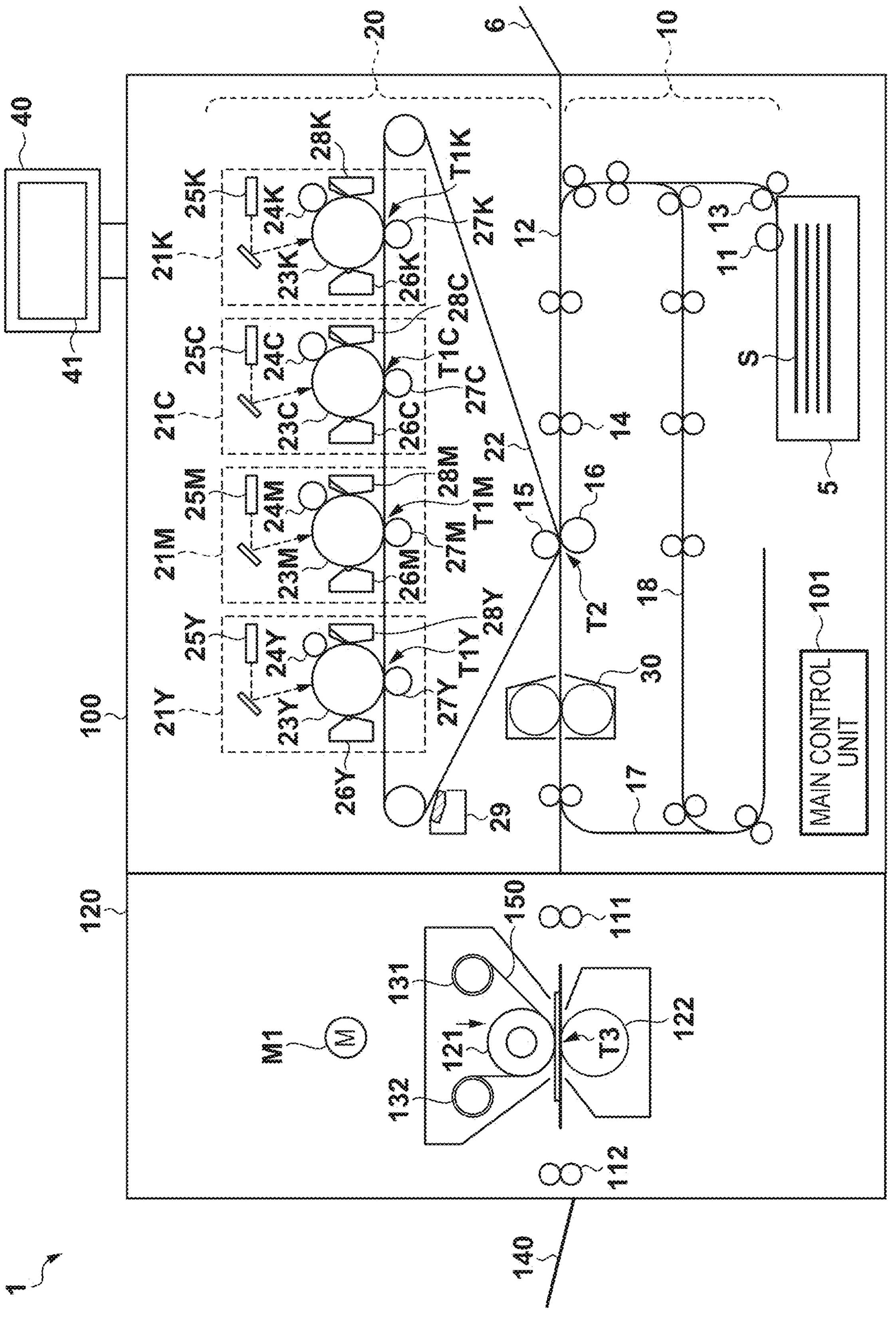
FIG. 11 is a diagram explaining an image forming system.
Figure 12:
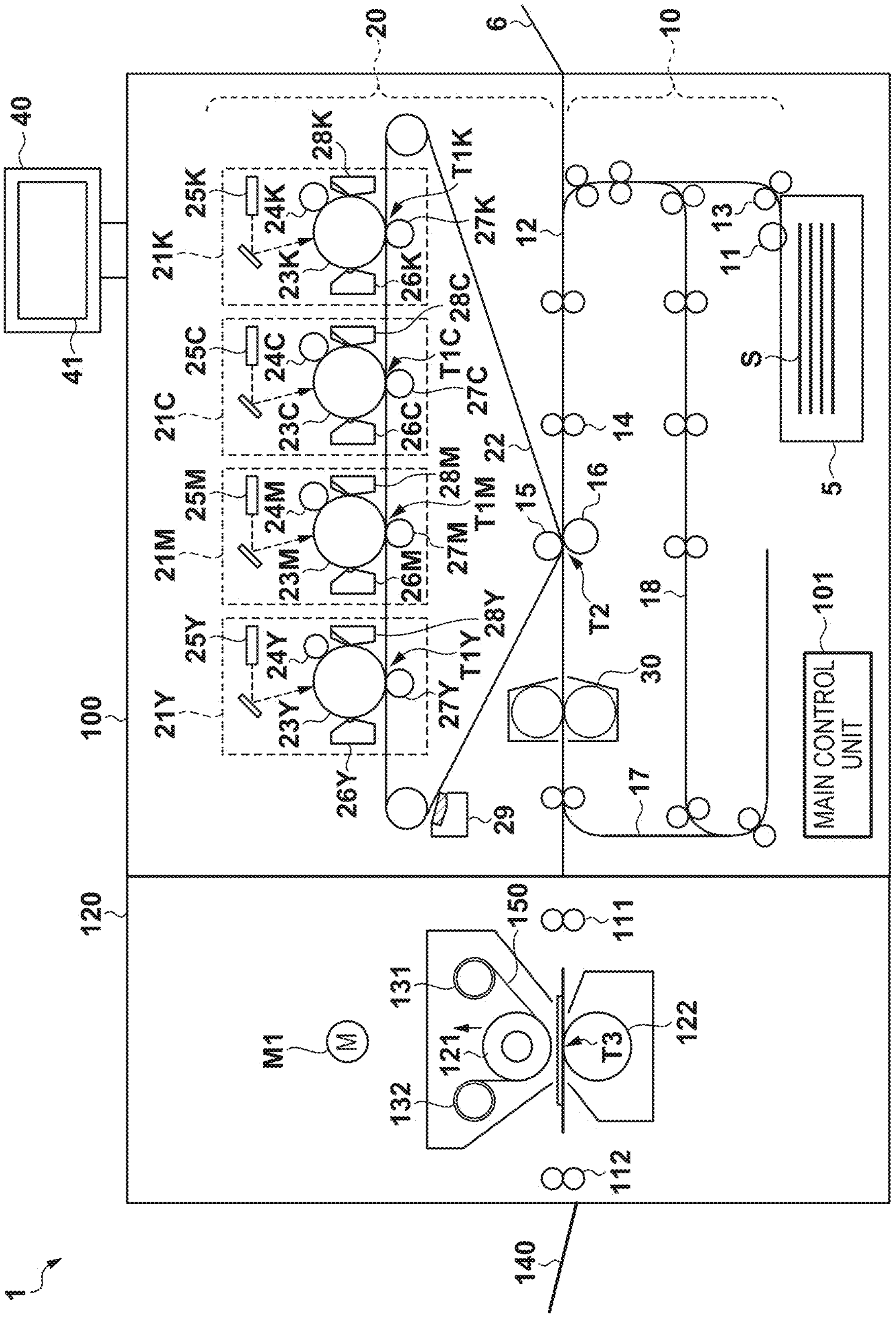
FIG. 12 is a diagram explaining an image forming system.

FIG. 11 and FIG. 12 show an image forming system 1 including an a foil printer 120 and an image forming apparatus 100 that are coupled to each other. FIG. 11 shows that the heating roller 121 and the pressure roller 122 are in a contact state (in a foil processing state). FIG. 12 shows that the heating roller 121 and the pressure roller 122 are in a separation state (in a state in which foil processing is not executed). That is, the contact state is adopted in the foil printing mode. In the normal printing mode, the separation state is adopted. The motor M1 is a motor for switching between the contact state and the separation state.

Figure 13:
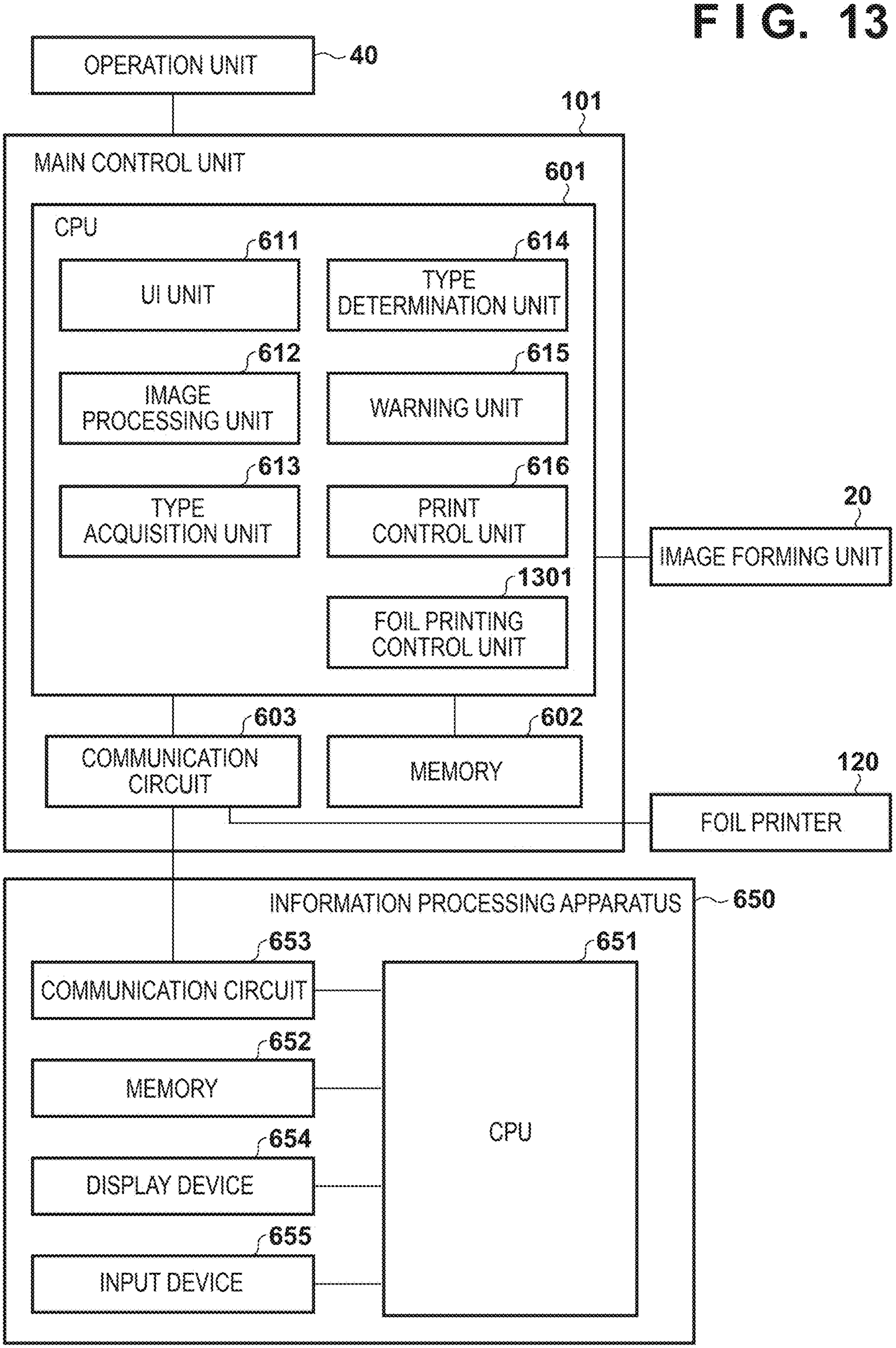
FIG. 13 is a drawing explaining a controller.

FIG. 13 shows a controller. The foil printing control unit 1301 controls the foil printer 120.

When accepting a print job from the information processing apparatus 650, the image forming apparatus 100 forms a toner image in an area to which foil processing is applied on the sheet S, and the conveyance unit 10 conveys the sheet S to the foil printer 120.

The CPU 601 (foil printing control unit 1301) controls the motor M1 to shift the heating roller 121 and the pressure roller 122 from the separation state to the contact state. The foil printer 120 transfers the foil to the toner image on the sheet S by hot pressing and discharges the sheet S to the discharge tray 140. Thus, a foil image is formed on the sheet S. When the foil processing is completed, the CPU 601 (foil printing control unit 1301) controls the motor M1 to shift the heating roller 121 and the pressure roller 122 from the contact state to the separation state. This restricts or prohibits the foil processing to the sheet S that does not require the foil processing.

Note that the CPU 601 may acquire, from the foil printer 120 via the communication circuit 603, type information indicating the type of the sheet S suitable for foil processing.

The CPU 601, the CPU 651 or the type acquisition unit 613 may acquire, from the foil printer 120 via the communication circuit 603, type information indicating the type of the sheet S that is not suitable for foil processing. In this case, the type determination unit 614 may compare the type information selected by the user with the type information indicating the type of the sheet S that is not suitable for foil processing.

IV. Supplement

The image forming unit 20 is an example of an image forming unit that is provided in the image forming apparatus 100 and forms a toner image on the sheet S as an adhesive. The CPUs 601, 651 are examples of a control unit that controls the image forming unit. The CPUs 601, 651, the UI 400, and the like functions as a selection unit for selecting a predetermined printing mode for forming a toner image for adhering the foil onto the sheet via the toner image. The CPUs 601, 651, the operation unit 40, and the input device 655 function as an acceptance unit that accepts information about the type of the sheet. When a predetermined printing mode is selected, the CPUs 601, 651, the warning unit 615, the operation unit 40, and the display device 654 function as a display unit that displays a warning according to information about the type of the sheet. This reduces the possibility that a defect occurs in the adhesion of the foil according to the type of the sheet.

The CPUs 601, 651 and the type acquisition unit 613 may function as an acquisition unit that acquires the type of the sheet S on which the toner image is formed by the image forming apparatus 100 as an adhesive. The CPUs 601, 651, the warning unit 615, the operation unit 40, and the display device 654 function as an output unit that outputs warning information when the acquired type is a type not recommended by the foil printer 120. In this way, the output of the warning information may cause the user to know the type not recommended in the foil printer 120 and refrain from selecting such type.

The acquired type may be a type (non-recommended type) that is not recommended in the foil printer 120. Here, the CPUs 601, 651, the operation unit 40, the input device 655, and the warning UI 800 function as an acceptance unit that accepts input of instruction information related to whether or not to continue forming a toner image on the sheet S by the image forming apparatus 100. Since the type of the sheet S is diverse, there may be coated paper that does not cause a defect in foil processing. Users may have known such coated papers through their experience. By allowing such a user to continue printing, usability is improved.

As described with reference to FIG. 8, the image forming apparatus 100 may continue forming a toner image on a sheet S of a non-recommended type upon accepting input of instruction information indicating that the formation of the toner image on the sheet S continues.

As illustrated in FIG. 8, the type change button 804 is an example of an acceptance unit that accepts input of instruction information regarding whether or not to change the type of the sheet S when the acquired type is a non-recommended type. As a result, the type of the sheet S is changed from the non-recommended type to the recommended type, and a defect in the foil processing is unlikely to occur.

As illustrated in FIG. 3B and FIG. 5, the operation unit 40 and the display device 654 may display a screen (e.g. UI 300, UI 500) for changing or resetting the type of the sheet S when instruction information indicating that the type of the sheet S is to be changed is inputted.

The type acquisition unit 613 may acquire the type of the sheet S on which the toner image is formed as an adhesive by the image forming apparatus 100 through a screen (e.g. UI 300, UI 500) for setting the type of the sheet S.

As illustrated in FIG. 3B and FIG. 5, the screen may display types that are not recommended in the foil printer 120 and types that are recommended in the foil printer 120 in a manner that they are visually distinguishable. This will allow the user to visually understand the deprecated (non-recommended) and recommended types.

The sheet S of the non-recommended type is, for example, a sheet that contains a component having an allowable temperature limit lower than the heating temperature of the toner image by the foil printer 120 as a main component.

The sheet S of the non-recommended type is, for example, a sheet having a resin layer on the surface of the sheet S.

The sheet S of the non-recommended type is, for example, a sheet containing latex.

As illustrated in FIG. 9A and FIG. 9B, the tab 302 and the UI 500 are examples acceptance units that accept input of a type of the sheet S on which the toner image is formed. The CPUs 601, 651 may restrict the input of the non-recommended type through the acceptance unit. That is, the CPUs 601, 651 function as control units that control the acceptance unit to restrict input of the type not recommended in the foil printer.

As illustrated in FIG. 9A and FIG. 9B, the tab 302 and UI 500 are examples of screens for accepting input of type information indicating a type of a sheet on which a toner image is to be formed. The tab 302 and the UI 500 may not display the non-recommended types as selectable candidates (e.g., display with grayed out), and may display the recommended types as selectable candidates.

When the predetermined printing mode is selected, the CPUs 601, 651 function as control units that control the acceptance unit so that a first type can be selected as a type of the sheet and a second type different from the first type cannot be selected. This reduces the possibility that a defect occurs in the adhesion of the foil according to the type of the sheet.

The communication circuit 653 functions as a transmitting unit that transmits a job for forming a toner image on a sheet S to the image forming apparatus 100 as an adhesive for adhering the foil onto the sheet S in the foil printer 120. The CPU 651 functions as a control unit that controls image forming apparatus 100 through the communication circuit 653. The input device 655 functions as an acceptance unit that selects a predetermined printing mode for forming a toner image for adhering foil onto a sheet via the toner image, and accepts information on the type of the sheet. When a predetermined printing mode is selected, the display device 654 functions as a display unit that displays a warning according to information related to the type of the sheet.

When the predetermined printing mode is selected, the CPU 651 may control the acceptance unit such that the first type can be selected as the type of the sheet and the second type different from the first type cannot be selected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-060397, filed Apr. 3, 2024 which is hereby incorporated by reference herein in its entirety.

What is claimed is:

1. An image forming apparatus comprising:

an input unit configured to accept input of selection of a predetermined printing mode for forming a toner image for adhering foil onto a sheet via the toner image and information related to a type of the sheet;

an image forming unit configured to form the toner image on the sheet; and a display unit configured to display a warning according to the information related to the type of sheet in a case where the predetermined printing mode is selected through the input unit, wherein the display unit is further configured to output the warning when the type is a type that is not recommended in a foil printer for adhering the foil onto the sheet via the toner image.

2. The image forming apparatus according to claim 1, wherein the input unit is further configured to accept input of instruction information related to whether to continue forming the toner image on the sheet by the image forming apparatus in a case where the type is a type that is not recommended in the foil printer.

3. The image forming apparatus according to claim 2, wherein the image forming apparatus is further configured to continue forming the toner image on the sheet of the type that is not recommended in the foil printer in a case where the instruction information indicating that formation of the toner image on the sheet continues is input.

4. The image forming apparatus according to claim 1, wherein the input unit is further configured to accept input of instruction information related to whether to change the type of the sheet in a case where the type is a type that is not recommended in the foil printer.

5. The image forming apparatus according to claim 4, wherein the display unit is further configured to display a screen for changing or resetting the type of sheet in a case where the instruction information indicating changing the type of sheet is input.

6. The image forming apparatus according to claim 1, wherein the input unit is further configured to accept, through a screen for setting the type of the sheet, information related to the type of sheet on which the toner image is formed as an adhesive by the image forming apparatus.

7. The image forming apparatus according to claim 5, wherein the screen is configured to display a type that is not recommended in the foil printer and a type that is recommended in the foil printer such that they are visually distinguishable.

8. The image forming apparatus according to claim 1, wherein the sheet of the type that is not recommended in the foil printer is a sheet containing a component having an allowable temperature limit lower than a heating temperature of the toner image by the foil printer as a main component.

9. The image forming apparatus according to claim 1, wherein the sheet of the type that is not recommended in the foil printer is a sheet having a resin layer on a surface of the sheet.

10. The image forming apparatus according to claim 1, wherein the sheet of the type that is not recommended in the foil printer is a sheet containing latex.

11. The image forming apparatus according to claim 1, wherein the input unit is further configured to accept input of a type of sheet on which the toner image is formed by the image forming unit, and the image forming apparatus further comprises a control unit configured to control the input unit to restrict input of a type that is not recommended in the foil printer.

12. The image forming apparatus according to claim 1, wherein the display unit is further configured to display a screen for accepting input of type information indicating a type of the sheet on which the toner image is formed by the image forming unit, and the display unit is further configured to display a type that is not recommended in the foil printer as a selectable candidate, and to display a type that is recommended in the foil printer as a selectable candidate.

13. An image forming system comprising:

an image forming apparatus; and a foil printer configured to adhere foil onto a sheet via a toner image formed on the sheet by the image forming apparatus, wherein the image forming apparatus comprises:

an input unit configured to accept input of selection of a predetermined printing mode for forming a toner image for adhering foil onto a sheet via the toner image and information related to a type of the sheet;

an image forming unit configured to form the toner image on the sheet; and a display unit configured to display a warning according to the information related to the type of sheet in a case where the predetermined printing mode is selected through the input unit, and wherein the display unit is further configured to output the warning when the type is a type that is not recommended in the foil printer for adhering the foil onto the sheet via the toner image.

14. An information processing apparatus comprising:

a transmitting unit configured to transmit a job for forming a toner image on a sheet to an image forming apparatus as an adhesive for adhering foil onto the sheet in a foil printer;

a control unit configured to control the image forming apparatus through the transmitting unit;

an input unit configured to accept input for accepting a selection of a predetermined printing mode for forming the toner image for adhering the foil onto the sheet via the toner image and input of information related to a type of the sheet; and a display unit configured to display a warning according to the information related to the type of sheet in a case where the predetermined printing mode is selected, wherein the display unit is further configured to output the warning when the type is a type that is not recommended in the foil printer for adhering the foil onto the sheet via the toner image.

* * * * *